United States Patent [19]

Kowalczy et al.

[11] Patent Number: 5,217,750
[45] Date of Patent: Jun. 8, 1993

[54] POWDER TREATMENT PROCESS TO CONTROL ALLOY FRACTIONATION

[75] Inventors: Lawrence E. Kowalczyk, Penfield; Barry A. Lees, Fairport; Monroe J. Hordon, Pittsford; Paul F. Zukoski, Henriettas; Alan B. Mistrater, Fairport, all of N.Y.

[73] Assignee: Xerox Corporation, Stamford, Conn.

[21] Appl. No.: 886,201

[22] Filed: May 21, 1992

[51] Int. Cl.$^5$ .................... G03G 5/082; C22F 1/00; C01B 19/00; B05D 5/06
[52] U.S. Cl. .................... 427/76; 420/579; 427/242; 427/250; 430/85; 430/86; 430/128; 430/135
[58] Field of Search .................... 427/76, 242, 250; 420/579; 430/128, 135, 85, 86

[56] References Cited

U.S. PATENT DOCUMENTS

| | | | |
|---|---|---|---|
| 4,205,098 | 5/1980 | Kobayashi et al. | 427/76 |
| 4,780,386 | 10/1988 | Hordon et al. | 430/58 |
| 4,822,712 | 4/1989 | Foley et al. | 430/128 |
| 4,842,973 | 6/1989 | Badesha et al. | 430/128 |
| 4,920,025 | 4/1990 | Sweatman et al. | 430/128 |
| 5,002,734 | 3/1991 | Kowalczyk et al. | 420/579 |
| 5,035,857 | 7/1991 | Kowalczyk et al. | 420/579 |

*Primary Examiner*—Paul E. Knopka
*Attorney, Agent, or Firm*—Judith L. Byorick

[57] ABSTRACT

Disclosed is a process which comprises providing an alloy of selenium, preparing powdered particles of the alloy with an average particle diameter of less than 300 microns, placing the powdered particles into a container and tumbling the container, and subsequently removing the powdered particles from the container and compressing the powdered particles into pellets.

20 Claims, No Drawings

POWDER TREATMENT PROCESS TO CONTROL ALLOY FRACTIONATION

BACKGROUND OF THE INVENTION

The present invention relates in general to the treatment of selenium alloy particles prior to vapor deposition of the selenium alloy on a substrate and using the treated selenium alloy particles in a process to vapor deposit a selenium alloy layer onto a substrate to form electrophotographic imaging members. One embodiment of the present invention is directed to a process which comprises providing an alloy of selenium, preparing powdered particles of the alloy with an average particle diameter of less than 300 microns, placing the powdered particles into a container and tumbling the container, and subsequently removing the powdered particles from the container and compressing the powdered particles into pellets. The present invention enables reduced fractionation of selenium and other alloying components during vacuum evaporation of selenium alloy particles that have been subjected to the process.

The formation and development of images on the imaging surfaces of electrophotographic imaging members by electrostatic means is well known. One of the most widely used processes is xerography, described in, for example, U.S. Pat. No. 2,297,691 to Chester Carlson. Numerous different types of electrophotographic imaging members for xerography, i.e. photoreceptors, can be used in the electrophotographic imaging process. Such electrophotographic imaging members can include inorganic materials such as selenium and selenium alloys, organic materials, and mixtures thereof. Electrophotographic imaging members can comprise contiguous layers in which at least one of the layers performs a charge generation function and another layer forms a charge carrier transport function, or can comprise a single layer which performs both the generation and transport functions. These electrophotographic imaging members can also be coated with a protective overcoating to improve wear.

Electrophotographic imaging members based on amorphous selenium have been modified to improve panchromatic response, increase speed, and improve color copyability. These devices are typically based on alloys of selenium with tellurium and/or arsenic. The selenium electrophotographic imaging members can be fabricated as single layer devices comprising a selenium-tellurium, selenium-arsenic, or selenium-tellurium-arsenic alloy layer which performs both charge generation and charge transport functions. The selenium electrophotographic imaging members can also comprise multiple layers such as, for example, a selenium alloy transport layer and a contiguous selenium alloy generator layer.

A common technique for manufacturing photoreceptor plates entails vacuum deposition of a selenium alloy to form an electrophotographic imaging layer on a substrate. Tellurium is incorporated as an additive for the purpose of enhancing the spectral sensitivity of the photoconductor. Arsenic is incorporated as an additive for the purpose of improving wear characteristics, passivating against crystallization, and improving electricals. Typically, the tellurium addition is incorporated as a thin selenium-tellurium alloy layer deposited over a selenium alloy base layer in order to achieve the benefits of the photogeneration characteristics of SeTe with the beneficial transport characteristics of SeAs alloys.

Fractionation of the tellurium and/or arsenic composition during evaporation results in a concentration gradient in the deposited selenium alloy layer during vacuum evaporation. Thus, the term "fractionation" is used to describe inhomogeneities in the stoichiometry of vacuum deposited alloy thin films. Fractionation occurs as a result of differences in the partial vapor pressure of the molecular species present over the solid and liquid phases of binary, ternary, and other multicomponent alloys. Alloy fractionation is a generic problem with chalcogenide alloys. A key element in the fabrication of doped photoreceptors is the control of fractionation of alloy components such as tellurium and/or arsenic during the evaporation of selenium alloy layers. Tellurium and/or arsenic fractionation control is particularly important because the local tellurium and/or arsenic concentration at the extreme top surface of the structure, denoted as top surface tellurium (TST) or top surface arsenic (TSA), directly affects xerographic sensitivity, charge acceptance, dark discharge, copy quality, photoreceptor wear, and crystallization resistance. In deposited layers of alloys of Se-Te, the normal percentages of top surface tellurium can cause excessively high photosensitivity. This photosensitivity is variable and changes as the surface of the layer wears away. Surface injection of corona deposited charge and thermally enhanced bulk dark decay involving carrier generation cause the toner images in the final copies to exhibit a washed out, low density apperance. Excessive dark decay causes loss of high density in solid areas of toner images and general loss of image density. In single layer low arsenic selenium alloy photoreceptors, arsenic enrichment at the top surface due to fractionation can also cause severe reticulation of the evaporated film, electrical instability, and excessive dark decay. In two layer of multilayer photoreceptors where low arsenic alloys may be incorporated as a base or transport layer, arsenic enrichment at the interface with the layer above can lead to severe residual cycle up problems. In single layer tellurium selenium alloy photoreceptors, tellurium enrichment at the top surface due to fractionation can cause undue sensitivity enhancement, poor charge acceptance and enhancement of dark discharge. In two layer or multilayer photoreceptors where tellurium alloys may be incorporated as a generator layer, tellurium enrichment at the upper surface of the tellurium alloy layer can result in similar undue sensitivity enhancement, poor charge acceptance, and enhancement of dark discharge.

Thus, a significant problem encountered in the fabrication of selenium alloy photoreceptors is the fractionation or preferential evaporation of a species such that the resulting film composition does not replicate the original composition. In other words, the deposited film or layer does not have a uniform composition extending from one surface to the other. For example, when tellurium is the dopant, the tellurium concentration is unduly high at the top surface and approaches zero at the bottom of the vacuum deposited layer. This problem is also observed for alloys of Se-Te, Se-As, Se-As-Te, Se-As-Te-Cl, and the like and mixtures thereof.

U.S. Pat. No. 4,822,712 (Foley et al.), the disclosure of which is totally incorporated herein by reference, discloses an alloy treatment process which comprises providing particles of an alloy comprising amorphous selenium and an alloying component selected from the group consisting of tellurium, arsenic, and mixtures thereof, the particles having an average particle size of at least about 300 microns and an average weight of less than about 1000 milligrams, forming crystalline nuclei on at least the surface of the particles while maintaining the substantial surface integrity of the particles (by processes which may include mechanical abrasion of the particles), heating the particles to an initial temperature between about 50° C. and about 80° C. for at least about 30 minutes to form a thin, substantially continuous layer of crystalline material on the surface of the particles while maintaining the core of selenium alloy in the particles in an amorphous state, and rapidly heating the particles to at least a second temperature below the softening temperature of the particles that is at least 20° C. higher than the initial temperature and between about 85° C. and about 130° C. to crystallize about 5 to 100 percent by weight of the amorphous core of selenium alloy in the particles while maintaining the integrity of the alloy particles and inhibiting the loss of selenium rich material. The resulting crystallized particles in shot or pellet form may be rapidly heated in a vacuum chamber to vacuum deposit the alloy onto a substrate.

U.S. Pat. No. 4,842,973 (Badesha et al.), the disclosure of which is totally incorporated herein by reference, discloses a process for fabricating an electrophotographic imaging member which comprises providing in a vacuum chamber at least one crucible containing particles of an alloy comprising selenium and an alloying component selected from the group consisting of tellurium, arsenic, and mixtures thereof, providing a substrate in the vacuum chamber, applying a partial vacuum to the vacuum chamber, and rapidly heating the crucible to a temperature between about 250° C. and 450° C. to deposit a thin continuous selenium alloy layer on the substrate. A plurality of selenium containing layers may be formed by providing in a vacuum chamber at least one first layer crucible containing particles of selenium or a selenium alloy, at least one second layer crucible containing particles of an alloy comprising selenium, and a substrate, applying a partial vacuum to the vacuum chamber, heating the particles in the first layer crucible layer to deposit a thin continuous selenium or selenium alloy first layer on the substrate, maintaining the particles in the second layer crucible at a first temperature below about 130° C. while the thin continuous selenium or selenium alloy first layer is deposited on the substrate, and rapidly heating the particles in the second layer crucible to a second temperature between about 250° C. and about 450° C. to deposit a thin continuous selenium alloy second layer on the substrate. The selenium alloy shot or pellet particles employed may be subject to surface abrasion prior to evaporation to produce surface crystallization.

U.S. Pat. No. 4,780,386 (Hordon et al.), the disclosure of which is totally incorporated herein by reference, discloses a process for preparing an electrophotographic imaging member comprising providing large particles of an alloy comprising selenium, tellurium and arsenic, the large particles having an average particle size of at least about 300 microns and an average weight of less than about 1000 milligrams, mechanically abrading the surfaces of the large particles while maintaining the substantial surface integrity of the large particles to form between about 3 percent by weight to about 20 percent by weight dust particles based on the total weight of the alloy prior to mechanical abrasion.

U.S. Pat. No. 5,002,734 (Kowalczyk et al.), the disclosure of which is totally incorporated herein by reference, discloses a process for the preparation of chalcogenide alloys which comprises crystallizing a chalcogenide alloy, grinding and pelletizing the crystallized product, and evaporating the alloy on, for example, a supporting substrate to form a photoreceptor.

Although known processes are suitable for their intended purposes, difficulties continue to be encountered in achieving precise control of tellurium and/or arsenic fractionation in the outer surface of a vacuum deposited photoconductive layer. This, in turn, affects the physical or electrical properties of the final photoreceptor. Photoreceptors containing large batch to batch top surface tellurium or arsenic concentrations tend to exhibit correspondingly large batch to batch variations in physical or electrical properties, which is unacceptable in high speed precision copiers, duplicators and printers because of copy quality variations. Moreover, variations in physical or electrical properties as a photoreceptor surface wears away during cycling is unacceptable in high speed precision copiers, duplicators, and printers, particularly during long length runs where, for example, the copy quality should be uniform from the first copy to thousands of copies. High speed copiers, duplicators and printers are constrained by narrow operating windows that require photoreceptors having precise, predictable operating characteristics from one batch to the next and during cycling.

Thus, there is a need for improved processes for preparing photoreceptors comprising selenium alloys containing additives such as tellurium and/or arsenic. There is also a need for processes for treating selenium alloys which control the relative quantity of tellurium and/or arsenic formed in the top surface layer of vacuum deposited selenium alloys containing tellurium and/or arsenic. A need further remains for processes for treating selenium alloys which maintain batch-to-batch top surface tellurium and/or arsenic concentrations in the top surface layer of vacuum deposited selenium alloys containing tellurium and/or arsenic. In addition, there is a need for processes for treating selenium alloys which reduce the tellurium and/or arsenic distribution variation through the thickness of a photoconductive layer of an alloy of selenium with tellurium and/or arsenic. Further, there is a need for processes for treating selenium alloys which limit the loss of selenium rich species early in the evaporation process. Additionally, there is a need for processes for treating selenium alloys which allow the achievement of TSA and TST values within narrower predefined limits. There is also a need for processes for treating selenium alloys which control the sensitivity of photoreceptors to light within narrower limits. A need also remains for processes for treating selenium alloys which produce evaporated films of selenium and its alloys with arsenic and/or tellurium which have superior photoconductive properties. In addition, there is a need for processes for treating selenium alloys which control the electrical cycling characteristics within narrower limits. Further, there is a need for processes for treating selenium alloys which control the mechanical wear characteristics of the photoreceptor surface within narrower limits. Additionally, there is a need for processes for treating selenium alloys which produce photoconducting devices which provide improved image quality when used in electrophotographic applications.

SUMMARY OF THE INVENTION

It is an object of the present invention to provide improved processes for treating alloys of selenium for electrophotographic imaging members which achieves at least some of the above-noted advantages.

It is another object of the present invention to provide processes for treating selenium alloys which control the relative quantity of tellurium and/or arsenic formed in the top surface layer of vacuum deposited selenium alloys containing tellurium and/or arsenic.

It is yet another object of the present invention to provide processes for treating selenium alloys which maintain batch-to-batch top surface tellurium and/or arsenic concentrations in the top surface layer of vacuum deposited selenium alloys containing tellurium and/or arsenic.

It is still another object of the present invention to provide processes for treating selenium alloys which reduce the tellurium and/or arsenic distribution variation through the thickness of a photoconductive layer of an alloy of selenium with tellurium and/or arsenic.

Another object of the present invention is to provide processes for treating selenium alloys which limit the loss of selenium rich species early in the evaporation process.

Still another object of the present invention is to provide processes for treating selenium alloys which allow the achievement of TSA and TST values within narrower predefined limits.

It is another object of the present invention to provide processes for treating selenium alloys which control the sensitivity of photoreceptors to light within narrower limits.

Yet another object of the present invention is to provide processes for treating selenium alloys which produce evaporated films of selenium and its alloys with arsenic and/or tellurium which have superior photoconductive properties.

It is yet another object of the present invention to provide processes for treating selenium alloys which control the electrical cycling characteristics within narrower limits.

Another object of the present invention is to provide processes for treating selenium alloys which control the mechanical wear characteristics of the photoreceptor surface within narrower limits.

Yet another object of the present invention is to provide processes for treating selenium alloys which produce photoconducting devices which provide improved image quality when used in electrophotographic applications.

Still another object of the present invention is to provide improved processes for preparing photoreceptors comprising selenium alloys containing additives such as tellurium and/or arsenic.

These and other objects of the present invention (or specific embodiments thereof) can be achieved by providing a process which comprises providing an alloy of selenium, preparing powdered particles of the alloy with an average particle diameter of less than 300 microns, placing the powdered particles into a container and tumbling the container, and subsequently removing the powdered particles from the container and compressing the powdered particles into pellets.

DETAILED DESCRIPTION OF THE INVENTION

The process of the present invention entails treating a selenium alloy by forming powdered particles of the alloy, tumbling the powdered particles, and subsequently forming the tumbled, powdered particles into pellets. Subsequent to this treatment process, the pellets can be used in a vacuum evaporation process to form layers of the alloy on a substrate, said layers exhibiting reduced fractionation.

As employed herein, a selenium alloy is defined as an intermetallic compound of selenium with other elemental additives where the ratios of constituents are inconsistent with stoichiometric compositions. Photoconductive alloys of selenium are to be distinguished from stoichiometric compounds of selenium such as arsenic triselenide ($As_2Se_3$). Stoichiometric compounds of selenium such as arsenic triselenide appear to present less of a fractionation problem compared to alloys of selenium such as alloys of selenium and tellurium. Typical photoconductive alloys of selenium include selenium-tellurium, selenium-arsenic, selenium-tellurium-arsenic, selenium-tellurium-chlorine, selenium-arsenic-chlorine, selenium-tellurium-arsenic-chlorine alloys, and the like. For electrophotographic applications, any effective relative amounts of selenium and the alloying component or components can be selected. Typically, a selenium-tellurium alloy will comprise from about 5 to about 40 percent by weight tellurium and from about 60 to about 95 percent by weight selenium, although the relative amounts can be outside of this range. When a halogen dopant is present in the selenium-tellurium alloy, such as chlorine or iodine, the dopant is present in any effective amount, typically up to about 70 parts per million by weight for chlorine and up to about 140 parts per million by weight for iodine, although these amounts can be outside of the stated ranges. Typically, a selenium-arsenic alloy will comprise from about 0.01 to about 35 percent by weight arsenic and from about 65 to about 99.99 percent by weight selenium, although the relative amounts can be outside of this range. When a halogen dopant is present in the selenium-arsenic alloy, such as chlorine or iodine, the dopant is present in any effective amount, typically up to about 200 parts per million by weight for chlorine and up to about 1,000 parts per million by weight for iodine, although these amounts can be outside of the stated ranges. Typically, a selenium-tellurium-arsenic alloy will comprise from about 5 to about 40 percent by weight tellurium, from about 0.1 to about 5 percent by weight arsenic, and from about 55 to about 94.9 percent by weight selenium. When a halogen dopant is present in the selenium-tellurium-arsenic alloy, such as chlorine or iodine, the dopant is present in any effective amount, typically up to about 200 parts per million by weight for chlorine and up to about 1,000 parts per million by weight for iodine, although these amounts can be outside of the stated ranges. The expressions "alloy of selenium" and "selenium alloy" are intended to include halogen doped alloys as well as alloys not doped with halogen.

Selenium alloys typically are prepared in shot or bead form. Generally, to prepare shot (bead) particles, the components of the selenium alloy are combined by melting the selenium and additives together by any suitable conventional technique. The molten selenium alloy is then shotted by any suitable method. Shotting is usually effected by quenching molten droplets of the alloy in a coolant such as water to form large particles of alloy in the form of shot or beads. Shotting processes for forming alloy beads are well known and described, for example, in U.S. Pat. No. 4,414,179 to S. Robinette, the disclosure of which is totally incorporated herein by reference. The alloy beads typically have an average particle diameter of, for example, from about 300 microns to about 3,000 microns, although the particle size can be outside of this range.

The process of the present invention entails treating powdered particles of selenium alloy prior to forming pellets from the powder. Powder particles can be prepared by grinding selenium alloy shot or bead particles into a powder by any suitable process. Typically, the alloy beads are rapidly ground in a conventional high speed grinder or attritor to form alloy particles typically having an average particle diameter of less than about 200 microns, although the particle size can be higher. Any suitable grinding device can be utilized to pulverize the bead particles to form the fine alloy particles. Typical grinders include hammer mills, jet pulverizers, disk mills, and the like. Depending upon the efficiency of the grinding device employed, grinding alloy beads to form alloy particles can normally be accomplished in less than about 5 minutes. Longer grinding times can be employed, if desired.

In a preferred embodiment of the present invention, the powdered particles of selenium alloy are prepared by incorporating beads or shots of selenium alloy into a micropulverizer known as the air-classifying vertical impact attritor mill. The attritor mill works on the principle of repeated impaction in a rotary assembly for input material carried in a high velocity air/gas stream. Oversized particles are caught at the rotor exit by revolving separator blades and directed back into the rotor area for additional impaction. Powders escaping the rotor assembly are carried into a cyclone chamber for gravity separation. The air stream velocity is used to classify particle size; extremely fine powders are carried away in the air stream, coarse particles are repeatedly impacted to the proper size and weight, and the main body of the powder is captured by gravity in the cyclone chamber and collected at the base of the chamber. The desired mean particle size and dispersion is established by adjustment of the rotor and separator rotation speeds and the air stream velocity. For example, shown in Table 1 below are the particle size distributions obtained at varying separator rotation speeds when shots comprising 99.3 percent by weight selenium and 10.7 percent by weight tellurium were incorporated into an ACM-1 air-classifying attritor mill, obtained from APM Technology, Inc., Madison, NJ.

| Separator Speed (revolutions per minute) | Mean Particle Diameter (microns) |
|---|---|
| 5250 | 12.8 |
| 4500 | 12.3 |
| 3750 | 14.2 |
| 3000 | 14.8 |

Rotor speed constant at 18,000 revolutions per minute

Other examples of suitable air-classifying attritor mills include the ACM-2L attritor mill, available from APM Technology, Inc., Madison, NJ, and attritor mills available from Pulverizing Machinery (Division of Micropul Corp.), Summit, NJ, from Alpine American Corp., Natick, MA, and from Sturtevant, Inc., Boston, MA.

Preparation of the alloy powder by air classification is preferred for several reasons. For example, mechanical grinding methods often require that the alloy particles be subjected to one or more repetitions of the grinding process. For example, when shots or beads of seleniumtellurium alloy are ground into powder by a mechanical hammer mill in which shots or beads of selenium alloy are dispersed in a stream of air or nitrogen gas, introduced into a circular raceway, and mechanically sheared by a series of revolving tungsten carbide-tipped hammers, alloys containing up to 12 percent by weight tellurium frequently require two grinding sequences to process the material satisfactorily. Alloys containing higher tellurium contents of up to 25 percent by weight typically require up to four grinding cycles by the mechanical method to obtain particles of desired size. Repeated grinding steps significantly increase fine powder wastage and raise the overall unit manufacturing cost in pellet production. In contrast, forming powdered alloy from alloy shots or beads by the air classification method typically requires only a single step or processing cycle. For example, Table 2 below shows the particle size distribution obtained when shots of seleniumtellurium alloy containing 10 percent by weight tellurium were mechanically ground to powder in a Paudel grinder, Model 2A, obtained from Fuji Industries, Japan:

| Paudel Grinder | Mean Particle Diameter (microns) |
|---|---|
| 1 pass | 20 |
| 2 passes | 16 |

As can be seen, in one pass, the particle size dispersion ranged from less than 3 microns in average diameter to coarser particles above 70 microns in average diameter, with a median size of about 20 microns in average diameter. The powder thus obtained after one pass through the mechanical mill was then compacted into pellets and the pellets were reintroduced into the mechanical mill to rework the coarser particles. After the second pass, the coarse particle size range above 30 microns was significantly reduced, with an average particle diameter of 16 microns. Thus, it is apparent that the air-classifying attritor mill is capable in a single operation of substantially reducing particle size variance and completely eliminating coarse particles above 40 microns in size, whereas at least two operations are required to obtain similar results by mechanical milling.

In addition to the advantage of increased efficiency, air-classifying is preferred for the present invention because the shape of powder particles of selenium alloy differs depending on the pulverizing method employed. For example, a mechanical hammer mill typically produces irregularly-shaped acicular particulates from the shearing action of the hammers. In contrast, an air-classifying attritor typically produces more rounded particles generated by random repeated impaction, which results in a more stable size/shape dispersion. Variance in particulate shape will affect the compaction density in the pelletizing step later in the process. The effect of more regularly shaped powder particles is to increase porosity in the compacted pellet. The increase in porosity is believed to decrease the rate of pellet melting in the crucible in vacuum coating for equivalent heating conditions, with a subsequent beneficial impact on fractionation of low vapor pressure additives.

Powder particles, typically ranging in size from about 0.3 to about 300 microns in average diameter, preferably from about 0.3 to 200 microns in average diameter, and more preferably from about 1 to about 50 microns in average diameter, are then tumbled according to the process of the present invention. The powder can be tumbled by any suitable technique, such as incorporating it into a container such as a jar and placing the container on a roll mill. Examples of suitable tumbling apparatuses include the Rota-Cone Blenders, available from Paul O. Abbé Inc., Little Falls, NJ, the Ribbon Blenders, available from Jayco, Inc., Mahwah, NJ, the Roll Mills, available from U.S. Stoneware, Mahwah, NJ, and the like. Tumbling takes place at any effective speed and for any effective length of time. Typically, the powdered particles of selenium alloy are tumbled in the container at a rotation speed of from about 30 to about 150 revolutions per minute, preferably from about 60 to about 120, although the rotation speed can be outside of these ranges. The size of the container preferably is such that the motion of the powders within is continuous, with no "dead" spots for the powder to remain stagnant. Continuous motion of the tumbling allows the particles to be "treated" by this mechanical action. The size of the container preferably is no more than 5 gallons capacity to allow ease of handling and sufficient tumbling action. A smaller sized container of about 2 gallons was employed for obtaining the above data, which container was tumbled at a rotational speed of about 90 revolutions per minute. If larger containers are employed, dead spots can be eliminated by using interior baffles to ensure powder motion. Mixing equipment manufacturers generally build these provisions into the design to ensure consistency in blending. Excessive motion of powder particles of selenium alloys preferably is avoided because excessive motion can lead to heat generation, which may cause the powder to agglomerate. Typically, the powdered particles of selenium alloy are tumbled for a period of from about 6 to about 24 hours, preferably from about 10 to about 16 hours, although the tumbling duration can be outside of these ranges.

Subsequent to tumbling of the powder particles of selenium alloy, the fine particles are compressed by any suitable technique into large particles of alloy usually referred to as pellets typically having an average weight of from about 50 milligrams to about 1,000 milligrams, although the weight can be outside of this range. A pellet weight greater than about 50 milligrams is generally preferred for ease of handling. When the pellet weight exceeds about 1,000 milligrams, evaporation discontinuities may be observed. The pellets can be of any suitable shape. Typical shapes include cylinders, spheres, cubes, tablets, and the like. Compression of the alloy particles into pellets can be accomplished with any suitable device such as, for example, a simple punch tableting press, a multi-punch rotary tableting press, or the like.

Selenium alloys treated according to the process of the present invention can be employed to fabricate single-layer or multi-layer imaging members by known processes, such as those described in, for example, U.S. Pat. Nos. 4,822,712, 4,842,973, 4,780,386, 5,002,734, 4,986,941, 5,075,191, and 5,084,301, the disclosures of each of which are totally incorporated herein by reference. The present invention also includes a process for forming an imaging member which comprises providing an alloy of selenium, preparing powdered particles of the alloy with an average particle diameter of less than 200 microns, placing the powdered particles into a container and tumbling the container, subsequently removing the powdered particles from the container and compressing the powdered particles into pellets, and vacuum evaporating the alloy pellets onto a substrate.

The imaging members prepared by the process of the present invention can be selected for known imaging and printing processes as disclosed in, for example, U.S. Pat. Nos. 4,265,990, 4,544,618, 4,560,635, and 4,298,672, the disclosures of each of which are totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

About 100 pounds of selenium-tellurium alloy shots containing 10.7 percent by weight tellurium with an average shot diameter of from about 2 to 4 millimeters (prepared by water quenching droplets of a molten alloy comprising 89.3 percent by weight selenium and 10.7 percent by weight tellurium) were ground in a Paudel grinder, Model 2A, obtained from Fuji Industries, Japan. The resulting powder particles had an average particle diameter of about 20 microns. Subsequently, 17 pounds of the ground powder was placed into a glass jar and the jar was placed on a roll mill (floor mounted, obtained from Paul O. Abbé, Inc., Little Falls, NJ) for 24 hours. The glass jar, approximately 2 gallon capacity, was placed on the roll mill at a speed of about 90 revolutions per minute. The tumbled powder was then formed into pellets ranging in thickness from 1.5 to 3 millimeters with diameters of 6 millimeters with a HATA 38 pelletizer, obtained from Elizabeth HATA, HT-AP38MSU, N. Huntington, PA. For comparison purposes, similarly sized pellets were also formed from some of the powder that had not been tumbled. Some of the pellets prepared by each method were reground to powder and repelletized, so that four different groups of pellets were made: (a) those wherein the powder was tumbled and wherein the tumbled powder was compressed into the final pellet, (b) those wherein the powder was not tumbled and wherein the tumbled powder was compressed into the final pellet, (a) those wherein the powder was tumbled, the tumbled powder was compressed into a pellet, and the pellet was reground into powder and then compressed into the final pellet, and (d) those wherein the powder was not tumbled, the tumbled powder was compressed into a pellet, and the pellet was reground into powder and then compressed into the final pellet.

The pellets thus prepared were incorporated into a vacuum coating apparatus and vacuum evaporated onto aluminum substrates previously vacuum coated with a chlorine doped selenium charge transport alloy material comprising selenium containing about 10 parts per million chlorine. This chlorine doped selenium alloy was evaporated from stainless steel crucibles at an evaporation temperature of from about 280° to about 330° C. and an evaporation pressure of from about $4 \times 10^{-4}$ to about $2 \times 10^{-5}$ torr. The aluminum substrates were cylindrical and comprised an outer aluminum oxide layer having a thickness of about 10 Angstroms. The diameter of the aluminum cylinders was about 8 centimeters. The substrate temperature was maintained at about 60° C. during this evaporation coating operation. The resulting halogen doped selenium transport layer had a thickness of about 55 microns and contained about 7 parts per million by weight chlorine. The transport layer coated substrates were thereafter coated with the selenium-tellurium alloy pellets described above to form charge generating photoconductive layers having a thickness of about 5 microns. This alloy was evaporated at a temperature of between about 300° C. and about 350° C. from stainless steel crucibles at a pressure of about $2 \times 10^{-5}$ torr.

The imaging members thus formed were tested in a test fixture which cycled them at a surface speed of about 13.9 centimeters per second. The imaging members were first charged in the dark to a positive potential of from about 900 to about 1,100 volts and exposed to an exposure source having spectral output in the blue region of the visible spectrum (about 470 nanometers) to reduce the potential to about 200 volts. Since the charge current was set prior to this test, the positive potential voltage acceptance levels were dependent upon the thickness of the imaging members. The variation in initial positive potential acceptance voltage of a typical imaging member may vary from about 0 to 20 volts. A charge acceptance voltage range of about 900 to 1,100 volts will provide good performance in automatic copiers. This range of positive potential voltages normally produces excellent solid area copy quality with no visible variation in density across the image for the first copy. The imaging members were then erased by uniform exposure to an array of neon lamps with a peak output in the green region (about 520 nanometers) of the visible spectrum. The sensitivity response of photoreceptors to light exposure of varying wavelength is generally measured by correlating initial dark development potential (P) and exposure light (l) at varying potential levels according to the relationship $$\sqrt{P} = a - Sl$$

where the parameter (a) is an empirical constant and where the parameter (S) characterizes the sensitivity of the development potential to light intensity. Extremely low values of the sensitivity parameter S can lead to loss of print line resolution due to underexposure of light, whereas extremely high values of the sensitivity parameter S can lead to imaging defects known as ghosting.

The imaging members were also tested for top surface concentration of tellurium. Testing was effected by detaching the deposited film from the substrate and determining the tellurium concentration at the top surface by X-ray diffraction.

| Pelletization Number of Passes | Non-tumbled Powder | | Tumbled Powder | |
|---|---|---|---|---|
| | TST | S | TST | S |
| 1 | 13.5% | 208 | 12.1% | 173 |
| 2 | 12.0% | 158 | 12.1% | 163 |

The pellets which had been formed from alloy powder that had not been tumbled prior to pelletization and formed by a process entailing grinding alloy shots to powder a single time and forming pellets, when vacuum evaporated onto a substrate, produced a selenium-tellurium alloy layer in which the top surface tellurium (TST) concentration was 13.5 percent. The pellets which had been formed from alloy powder that had not been tumbled prior to pelletization and formed by a process entailing grinding alloy shots to powder a first time, and forming pellets from the powder, grinding the pellets to powder a second time, and subsequently forming pellets of the twice-ground powder, when vacuum evaporated onto a substrate, produced a selenium-tellurium alloy layer in which the top surface tellurium (TST) concentration was 12.0 percent. The pellets which had been formed from alloy powder that had been tumbled prior to pelletization and had then been immediately formed into pellets with no further grinding steps, when vacuum evaporated onto a substrate, produced a selenium-tellurium alloy layer in which the top surface tellurium (TST) concentration was 12.1 percent. The pellets which had been formed from alloy powder that had been tumbled prior to pelletization and formed by a process entailing grinding alloy shots to powder a first time, and forming pellets from the powder, grinding the pellets to powder a second time, and subsequently forming pellets of the twice-ground powder, when vacuum evaporated onto a substrate, produced a selenium-tellurium alloy layer in which the top surface tellurium (TST) concentration was 12.1 percent. As these data indicate, tumbling the alloy powder prior to pelletization controls alloy fractionation during vacuum evaporation to a degree comparable to that obtained by repeating the entire grinding and pelletizing processes.

EXAMPLE II

Selenium-tellurium alloy shots containing 10.7 percent by weight tellurium with an average shot diameter of from about 2 to 4 millimeters (prepared by water quenching droplets of a molten alloy comprising 89.3 percent by weight selenium and 10.7 percent by weight tellurium) were ground into powder with an ACM-1 laboratory-sized air classification attritor, obtained from APM Technology, Inc., Madison, NJ. The resulting powder particles had an average particle diameter of about 20 microns. The alloy powder thus formed was then formed into pellets ranging in thickness from 1.5 to 3 millimeters with diameters of 6 millimeters with a HATA 38 pelletizer, obtained from Elizabeth HATA, HT-AP38MSU, N. Huntington, PA.

For comparison purposes, selenium-tellurium alloy shots containing 10.7 percent by weight tellurium prepared by the same process as above were ground into powder with a Paudel grinder, Model 2A, obtained from Fuji Industries, Japan. The resulting powder particles had an average particle diameter of about 20 microns. The alloy powder thus formed was then formed into pellets ranging in thickness from 1.5 to 3 millimeters with diameters of 6 millimeters with a HATA 38 pelletizer, obtained from Elizabeth HATA, HT-AP38MSU, N. Huntington, PA These pellets were subsequently reintroduced into the Paudel Model 2A grinder and reground into powder, and the powder was again formed into pellets ranging in thickness from 1.5 to 3 millimeters with diameters of 6 millimeters with a HATA 38 pelletizer, obtained from Elizabeth HATA, HT-AP38MSU, N. Huntington, PA.

The two sets of pellets were then each vacuum evaporated onto aluminum substrates which had previously vacuum coated with a chlorine doped selenium charge transport alloy material comprising selenium containing about 10 parts per million chlorine by the process described in Example I. The resulting photoreceptors exhibited the following electrical sensitivity characteristics:

|  | Air-Classifying Attritor Mill | Mechanical Hammer Mill |
| --- | --- | --- |
| No. of Grinding Processes | 1 | 2 |
| Average Photoreceptor Sensitivity (S560) | 283 | 280 |
| S560 Std. Dev. | 7 | 12 |

As the data indicate, the photoreceptor prepared with the pellets which had been formed from powder produced with the air-classifying mill exhibited similar electrical sensitivity characteristics to the photoreceptor prepared with the pellets which had been formed by two grinding processes with the mechanical hammer mill, with a measureable decrease in electrical sensitivity variance for the photoreceptor prepared with the pellets which had been formed from powder produced with the air-classifying mill.

EXAMPLE III

One hundred pounds of selenium-tellurium alloy shots containing 11.3 percent by weight tellurium (obtained from Mitsubishi Metals, Japan) were ground into powder with an ACM-2L production-sized air classification attritor, obtained from APM Technology, Inc., Madison, NJ. The resulting powder particles had an average particle diameter of about 20 microns. The alloy powder thus formed was then formed into pellets ranging in thickness from 1.5 to 3 millimeters with diameters of 6 millimeters with a HATA 38 pelletizer, obtained from Elizabeth HATA, HT-AP38MSU, N. Huntington, PA.

The pellets thus formed were then vacuum evaporated onto aluminum substrates which had been previously vacuum coated with a chlorine doped selenium charge transport alloy material comprising selenium containing about 10 parts per million chlorine by the process described in Example I. The electrical sensitivity S560 parameter for the resulting five photoreceptors averaged 211, which is a desirable value for a photoreceptor of this configuration and comparable to results obtained by vacuum evaporating pellets formed by two grinding processes with a mechanical hammer mill.

Other embodiments and modifications of the present invention may occur to those skilled in the art subsequent to a review of the information presented herein; these embodiments and modifications, as well as equivalents thereof, are also included within the scope of this invention.

What is claimed is:

1. A process which comprises providing an alloy of selenium, preparing powdered particles of the alloy with an average particle diameter of less than 300 microns, placing the powdered particles into a container and tumbling the container, and subsequently removing the powdered particles from the container and compressing the powdered particles into pellets.

2. A process according to claim 1 wherein the alloy comprises selenium and tellurium.

3. A process according to claim 2 wherein the alloy comprises selenium in an amount of from about 60 to about 95 percent by weight and tellurium in an amount of from about 5 to about 40 percent by weight.

4. A process according to claim 1 wherein the alloy comprises selenium and arsenic.

5. A process according to claim 4 wherein the alloy comprises selenium in an amount of from about 65 to about 99.99 percent by weight and arsenic in an amount of from about 0.01 to about 35 percent by weight.

6. A process according to claim 1 wherein the alloy comprises selenium, tellurium, and arsenic.

7. A process according to claim 1 wherein the alloy comprises selenium in an amount of from about 55 to about 94.9 percent by weight, tellurium in an amount of from about 5 to about 40 percent by weight, and arsenic in an amount of from about 0.1 to about 5 percent by weight.

8. A process according to claim 1 wherein the powdered particles of the alloy are prepared by an air-classifying attrition process.

9. A process according to claim 1 wherein the powdered particles of the alloy have an average particle diameter of from about 0.3 to about 200 microns.

10. A process according to claim 1 wherein the powdered alloy particles are tumbled for a period of from about 6 to about 24 hours.

11. A process according to claim 1 wherein the powdered alloy particles are tumbled at a speed of from about 30 to about 150 milligrams per minute.

12. A process according to claim 1 wherein the tumbled powdered alloy particles are formed into pellets having an average weight of from about 50 to about 1,000 milligrams.

13. A process for forming an imaging member which comprises providing an alloy of selenium, preparing powdered particles of the alloy with an average particle diameter of less than 300 microns, placing the powdered particles into a container and tumbling the container, subsequently removing the powdered particles from the container and compressing the powdered particles into pellets, and vacuum evaporating the alloy pellets onto a substrate.

14. A process according to claim 13 wherein the alloy comprises selenium and tellurium.

15. A process according to claim 13 wherein the alloy comprises selenium and arsenic.

16. A process according to claim 13 wherein the alloy comprises selenium, tellurium, and arsenic.

17. A process according to claim 13 wherein the powdered particles of the alloy are prepared by an air-classifying attrition process.

18. A process according to claim 13 wherein the powdered particles of the alloy have an average particle diameter of from about 0.3 to about 200 microns.

19. A process according to claim 13 wherein the powdered alloy particles are tumbled for a period of from about 6 to about 24 hours.

20. A process according to claim 13 wherein the powdered alloy particles are tumbled at a speed of from about 30 to about 150 milligrams per minute.

* * * * *